UNITED STATES PATENT OFFICE.

GEORGE FREDERICK RENDALL, OF NEW YORK, N. Y.

PROCESS OF PRODUCING CARBONATES AND CHLORIDS.

SPECIFICATION forming part of Letters Patent No. 721,091, dated February 17, 1903.

Application filed January 27, 1902. Serial No. 91,435. (No specimens.)

*To all whom it may concern:*

Be it known that I, GEORGE FREDERICK RENDALL, a subject of the King of Great Britain, residing in the city, county, and State of New York, have invented a new and useful Process of Simultaneously Producing Carbonates and Chlorids, of which the following is a specification.

My invention relates to a novel process of simultaneously producing carbonates and chlorids, wherein a dual operation is effected and the cost of production of carbonate of lead or other carbonates and chlorids is reduced to a minimum, the novel features of which are hereinafter fully set forth.

In carrying out the various steps of my process I first roast lead ore, thereby converting said ore into sponge lead or oxid, as $PbO$ or $Pb_2O$. If the product thus produced contains an excess of iron, the same is in practice eliminated by magnetic separation or by acid treatment, and the resulting product is placed in a solution of hydrated acetic acid and permitted to stand for the requisite time until it has become a basic solution, which latter operation can sometimes be assisted by heating.

In carrying out the next step I place in a closed vessel a suitable form of carbonate, either lime, zinc, or barium, and treat this carbonate with a solution of muriatic acid and water, thereby causing a somewhat violent ebullition, converting the carbonates into chlorids and evolving carbonic-acid gas. This carbonic-acid gas as it is generated is passed through water by means of a pipe or pipes for the purpose of cleaning it, and thence through the lead solution previously referred to.

It will thus be seen from the foregoing that a dual operation is simultaneously performed, since in one vessel carbonates of zinc, lime, or barium are converted into chlorids, a marketable product, while in the other vessel an amorphous precipitate of white lead is formed, the operation continuing until the solution commences to become acid, at which period the operation is discontinued and the solution is again used for the same purpose. The chlorid solutions can be evaporated to any desired degree of strength, or, if desirable, converted into solids, in which case the acid used can be recovered by distillation.

I am aware that it is generally known that solutions of acetic acid will dissolve lead oxids, and I am also aware that carbonates are converted into chlorids by the use of muriatic acid; but what I consider as the salient, novel, and patentable feature in my invention is the process wherein carbonic-acid gas after being generated in the manufacture of zinc, lime, or barium chlorids is utilized for the purpose of precipitating white lead from a hydrated lead solution, whereby there is no waste and the operations above recited can be effected with the greatest economy.

Another novel feature is in the process whereby only a portion of the lead contained in the acetic-acid solution is precipitated, thus enabling the same solution to be used again and again without appreciable loss.

It will be seen from the foregoing that by the steps above described I recover all the acetic acid used in the conversion of my lead into solution and the acetic acid is restored to its initial activity. It will also be seen that in the generation of the chlorid products I am converting a carbonate ore into a chlorid of merchantable and usable form and that by the dual operation I am able to largely and effectually reduce the cost of producing either or both of my products. It will also be seen that I am able to use and recover all acetic acid used without any distillation and that I can largely recover by distillation the muriatic acid used in the conversion of carbonates into chlorids. The dual operation is therefore one of great economy, and conducted simultaneously largely lessens the cost of the production of carbonates of lead and other chlorids.

It will be apparent that instead of confining my operations to carbonate of lead I may use such other solutions from which carbonates can be precipitated. If I use native carbonate of lead, such as cerusite, it is not necessary to employ any treatment previous to emersion in the hydrated acetic solution, as it is soluble without treatment.

Having thus described my invention, what I claim as new, and desire to secure by Letters Patent, is—

1. The process of simultaneously producing carbonates and chlorids, which consists in the following steps in the order named first in roasting lead ore whereby sponge is formed, next eliminating any excess of iron therefrom, next dissolving said sponge in a solution of hydrated acetic acid until it has become a basic solution, third, treating a carbonate with a solution of muriatic acid and water, thereby converting said carbonate into a chlorid and evolving carbonic-acid gas, and lastly, utilizing this carbonic-acid gas by passing the latter through said lead solution.

2. The herein-described process of producing carbonates and chlorids by a simultaneously-performed dual operation which consists in roasting lead ore to produce a sponge, eliminating the excess of iron therein, subjecting the resulting product to a solution of hydrated acetic acid permitting the same to stand until it becomes a basic solution assisting such operation by heating, treating a carbonate with a solution of muriatic acid and water and converting said carbonate into a chlorid and evolving carbonic-acid gas, cleansing the same, subjecting said solution to the influence of said gas and precipitating a portion only of the lead contained in said solution and recovering the acetic acid and muriatic acid.

GEORGE FREDERICK RENDALL.

Witnesses:
J. S. CHARLESON,
P. J. MERRICK.